(12) United States Patent
Shalashov et al.

(10) Patent No.: US 12,430,153 B2
(45) Date of Patent: Sep. 30, 2025

(54) CONFIGURATION OF A VIRTUAL ASSISTANT

(71) Applicant: HARMAN BECKER AUTOMOTIVE SYSTEMS GmbH, Karlsbad-Ittersbach (DE)

(72) Inventors: Ivan Vladimirovich Shalashov, Nizhny Novgorod (RU); Dmitry Anatolyevich Vasin, Nizhny Novgorod (RU); Oleg Nikolayevich Slepov, Nizhny Novgorod (RU); Svetlana Valeryevna Patrina, Nizhny Novgorod (RU); Vladislav Valeryevich Kuznetsov, Nizhny Novgorod (RU)

(*) Notice: Subject to any disclaimer, the term of this patent is extended or adjusted under 35 U.S.C. 154(b) by 0 days.

(21) Appl. No.: 18/251,386

(22) PCT Filed: Nov. 2, 2020

(86) PCT No.: PCT/RU2020/000585
§ 371 (c)(1),
(2) Date: May 1, 2023

(87) PCT Pub. No.: WO2022/093060
PCT Pub. Date: May 5, 2022

(65) Prior Publication Data
US 2024/0020139 A1    Jan. 18, 2024

(51) Int. Cl.
G06F 3/048    (2013.01)
G06F 9/451    (2018.01)
G06F 3/16     (2006.01)

(52) U.S. Cl.
CPC .............. G06F 9/453 (2018.02); *G06F 3/167* (2013.01)

(58) Field of Classification Search
None
See application file for complete search history.

(56) References Cited

U.S. PATENT DOCUMENTS

| 11,250,216 | B2* | 2/2022 | Demme | G06Q 20/40145 |
| 2013/0174034 | A1* | 7/2013 | Brown | G06Q 10/10 715/708 |
| 2016/0173578 | A1* | 6/2016 | Sharma | H04L 51/00 709/203 |
| 2018/0129484 | A1 | 5/2018 | Kannan et al. | |
| 2018/0232376 | A1* | 8/2018 | Zhu | G06F 40/35 |
| 2019/0166069 | A1* | 5/2019 | Yao | G06N 20/00 |
| 2021/0203623 | A1* | 7/2021 | Zhou | G06F 40/20 |
| 2021/0338177 | A1* | 11/2021 | Cavalli | A61B 5/165 |

FOREIGN PATENT DOCUMENTS

WO    2016094807 A1    6/2016

\* cited by examiner

*Primary Examiner* — Thanh T Vu
(74) *Attorney, Agent, or Firm* — Artegis Law Group, LLP

(57) ABSTRACT

A computer-implemented method for configuring a virtual assistant device, the method comprising: setting a first user request to be input via a user interface of the virtual assistant device; associating the first user request with a first output of the virtual assistant device; associating the first user request with a second output of the virtual assistant device; setting a control parameter to be determined by the virtual assistant device; and generating instructions for the virtual assistant which, when processed by the virtual assistant, configure the virtual assistant device to respond to the first user request by selecting either the first output or the second output depending on the determination of the control parameter by the virtual assistant device.

15 Claims, 4 Drawing Sheets

CONFIGURATION OF A VIRTUAL ASSISTANT

CROSS-REFERENCE TO RELATED APPLICATIONS

This application is a national stage application of the international application titled "CONFIGURATION OF A VIRTUAL ASSISTANT," filed on Nov. 2, 2020, and having application number PCT/RU2020/000585. The subject matter of this related application is hereby incorporated herein by reference.

FIELD

The present disclosure relates to configuring a virtual assistant. In particular, the present disclosure relates computer-implemented methods, devices, and systems for the configuration of a virtual assistant.

BACKGROUND

Virtual assistants allow communication between a user and a computing device by mimicking a conversation with a real human being. They may allow communication between a device and a user by natural language processing (NLP).

A user interface of a virtual assistant typically comprises one or more predefined dialogs, i.e. exchanges of user requests and virtual assistant replies. Dialogs may comprise a large number of possible user requests and replies, which need to be predefined. Therefore, a need exists for configuring a virtual assistant.

U.S. Ser. No. 10/678,406B1, US20030229855A1, and U.S. Pat. No. 7,143,042B1 relate to user interfaces for virtual assistants.

SUMMARY

Disclosed herein are methods, devices, and systems for configuring a virtual assistant.

A first aspect of the present disclosure relates to a computer-implemented method for configuring a virtual assistant. The method comprises:
  setting a first user request to be input via a user interface of the virtual assistant;
  associating the first user request with a first output of the virtual assistant;
  associating the first user request with a second output of the virtual assistant;
  setting a control parameter to be determined by the virtual assistant; and
  generating instructions for the virtual assistant which, when processed by the virtual assistant, configure the virtual assistant to respond to the first user request by selecting either the first output or the second output depending on the determination of the control parameter by the virtual assistant.

The user request and the outputs of the virtual assistant may allow communication with a user. Thereby, the virtual assistant device reacts to a user request by giving a first or second output. The output may further depend on a control parameter, so that the same user request may lead to two different outputs. Thereby, the reaction of the virtual assistant is not entirely determined by the user request, but may depend on, e.g., situational conditions. The virtual assistant may thereby take into account that the same user request may have a different meaning in a different context.

In an embodiment, the user interface of the virtual assistant is one of:
  a text user interface;
  a graphical user interface;
  an image-based user interface; and
  a speech-based user interface.

Thereby, the user interface may be a conversational user interface, i.e. a user interface that mimics communication in a natural language. The virtual assistant may have the form of a device comprising input and output hardware, such as speakers, a screen, a keyboard, or a microphone. The virtual assistant device may furthermore be implemented in software and executed on a server, coupled by a network to the input/output hardware. Alternatively, the virtual assistant device may be a chat bot.

In a further embodiment, the virtual assistant comprises a virtual assistant device and the control parameter is generated by a sensor communicatively coupled to the virtual assistant device. The sensor may be a clock, a temperature sensor, a camera, a global navigation system sensor or any other sensor. Thereby, a situational control parameter is determined. For example, if the virtual assistant device is comprised in a vehicle and the user asks for the availability of a service, such as a gas station, in proximity, the answer of the system may depend on the position. As another example, the sensor may be a circuit, implemented in hardware or software, that detects the identity of a speaker based on properties of the voice, so that the output can be conditional on the identity of the speaker.

In a further embodiment, an output of the virtual assistant causes one or more of:
  a text output by a display;
  a speech output by a speaker;
  loading or storing a variable in a memory;
  output of instructions to configure a device;
  execution of program code.

In particular, text and/or speech output may allow continuing the dialog with the user; thereby the virtual assistant gathers further information needed to comply with a user request. The further course of the dialog, in particular the number and content of further text and/or speech output may depend on the user requests. Thereby, the virtual assistant device may ask the user the relevant questions for a desired outcome, and avoid asking unnecessary questions so that a dialog is kept short and efficient.

In a further embodiment, the method further comprises:
  setting an initial output to be output via the user interface of the virtual assistant device;
  setting a second user request to be input via the user interface of the virtual assistant device; and
  associating the second user request with a third output of the virtual assistant device.

In this embodiment, the instructions configure the virtual assistant to respond to the second user request by selecting the third output. Furthermore, in this embodiment, the first user request and the second user request are associated with the initial output. The initial output may comprise a question asked by the virtual assistant device, to which a plurality of expected answers, e.g. the first and second user request, are set. Thereby, the user may choose between a plurality of options. In particular, a user request need not be a precisely predefined phrase. In case of a binary (yes/no) question, any answer in the affirmative may be associated, for example, with the third output, and any answer in the negative may be associated with either the first output or second output, depending on the control parameter as detailed above.

In a further embodiment, the method is executed by a computing device comprising a second user interface. The second user interface thereby allows a programmer to control the configuration of the virtual assistant device. A programming language specifically designed for this task may be provided.

In a further embodiment, the second user interface is a graphical or text user interface. In case of a graphical user interface, a graphical programming language may be used that depicts graphical elements, such as nodes indicative of one or more actions, and lines indicative of connections between nodes and/or actions. Actions may comprise user requests, outputs such as speech output, loading or storing data in a memory, or any of the operations detailed above.

In a further embodiment, setting one or more of the user requests and/or outputs comprises:
 providing, by the second user interface, one or more options for the user request and/or output;
 receiving, by the second user interface, an indication of the user request and/or output; and
 displaying a graphical element, comprised in the second user interface and indicative of the user request and/or output.

The options may be provided, for example, using a search form with an autocomplete function, or providing a drag & drop procedure to arrange graphical elements. In particular, a node may comprise a plurality of indicators for actions that are to be executed. A node may furthermore comprise one or more user requests, along with one or more control variables. This allows displaying related information in a compact way on a screen.

A second aspect of the present disclosure relates to a computing device for configuring a virtual assistant device. A third aspect of the present disclosure relates to a system, comprising the computing device and the virtual assistant device. All properties of the first aspect also apply to the second and third aspect.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

DETAILED DESCRIPTION OF THE PREFERRED EMBODIMENTS

Figure 1:
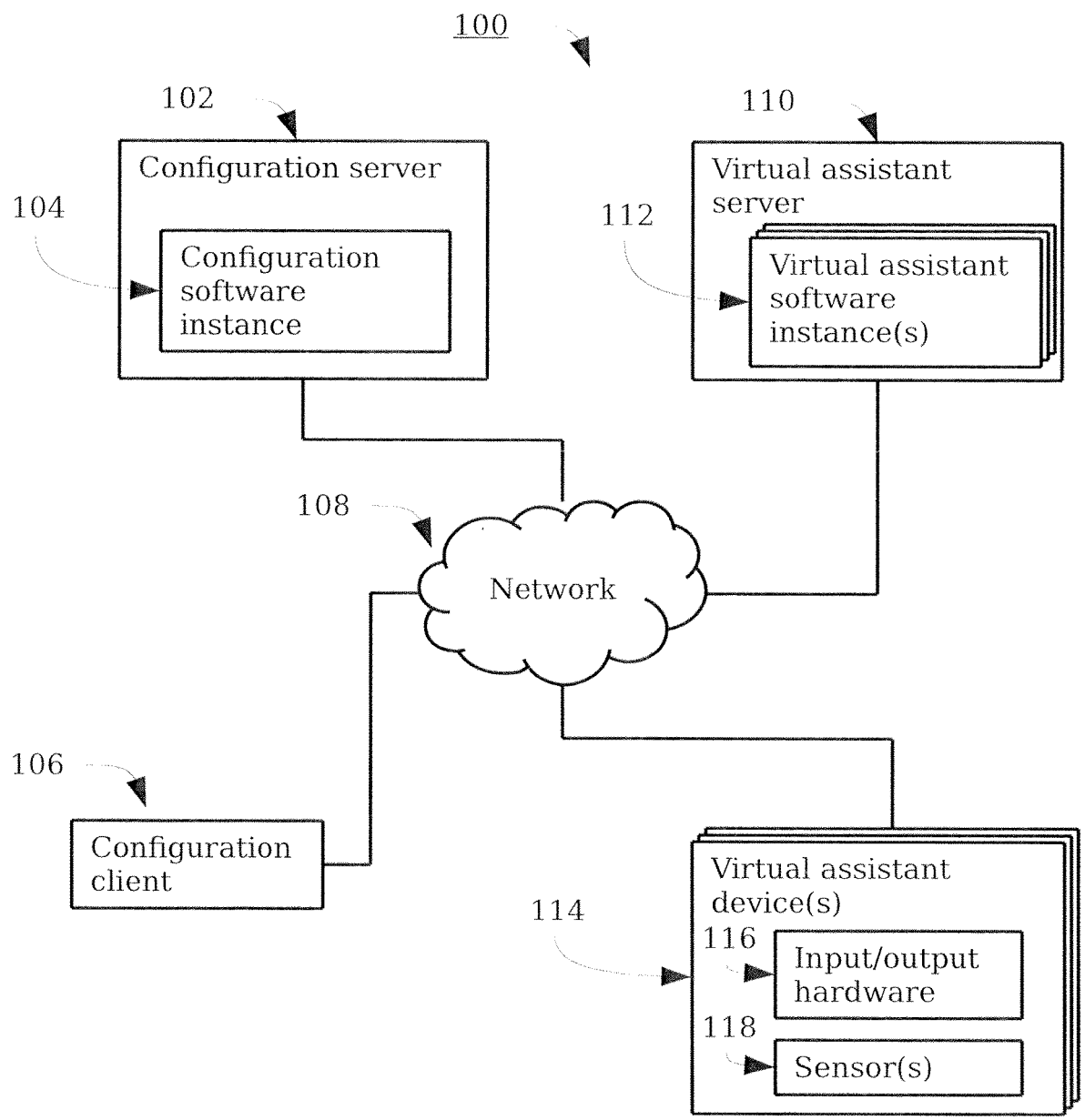
FIG. 1 represents a block diagram of a system according to an embodiment.

FIG. 1 shows a block diagram of a system 100 comprising a computing device for configuring a virtual assistant according to an embodiment. The computing device comprises a configuration server 102 executing the configuration software instance 104, and a configuration client 106, which is communicatively coupled to the configuration server via a network 108. The configuration software is configured to execute the steps of providing options to and receiving input from the developer via the configuration client 106. Thus, the developer may, using the configuration client 106, use the software 104 as a design tool to create content for a conversational user interface, CUI, of the virtual assistant, as detailed below. However, in an alternative embodiment, the design tool may be executed and accessed by a single computing device. Furthermore, system 100 comprises a virtual assistant which comprises a virtual assistant software instance 112 executed by a virtual assistant server 110, and a virtual assistant device 114, comprising input/output hardware 116 and sensor(s) 118. The software 112 may run a CUI, and the device 114 may comprise only the input/output hardware. In general, a plurality of virtual assistants may be used at the same time, each comprising one software instance 112 related to a device 114. In an alternative embodiment, however, the software 112 may be run on processing hardware in the virtual assistant device itself. Input/output hardware may comprise a microphone and a speaker in case of a voice-based CUI, or a screen and a keyboard in case of a text-based or graphical CUI.

Figure 2:
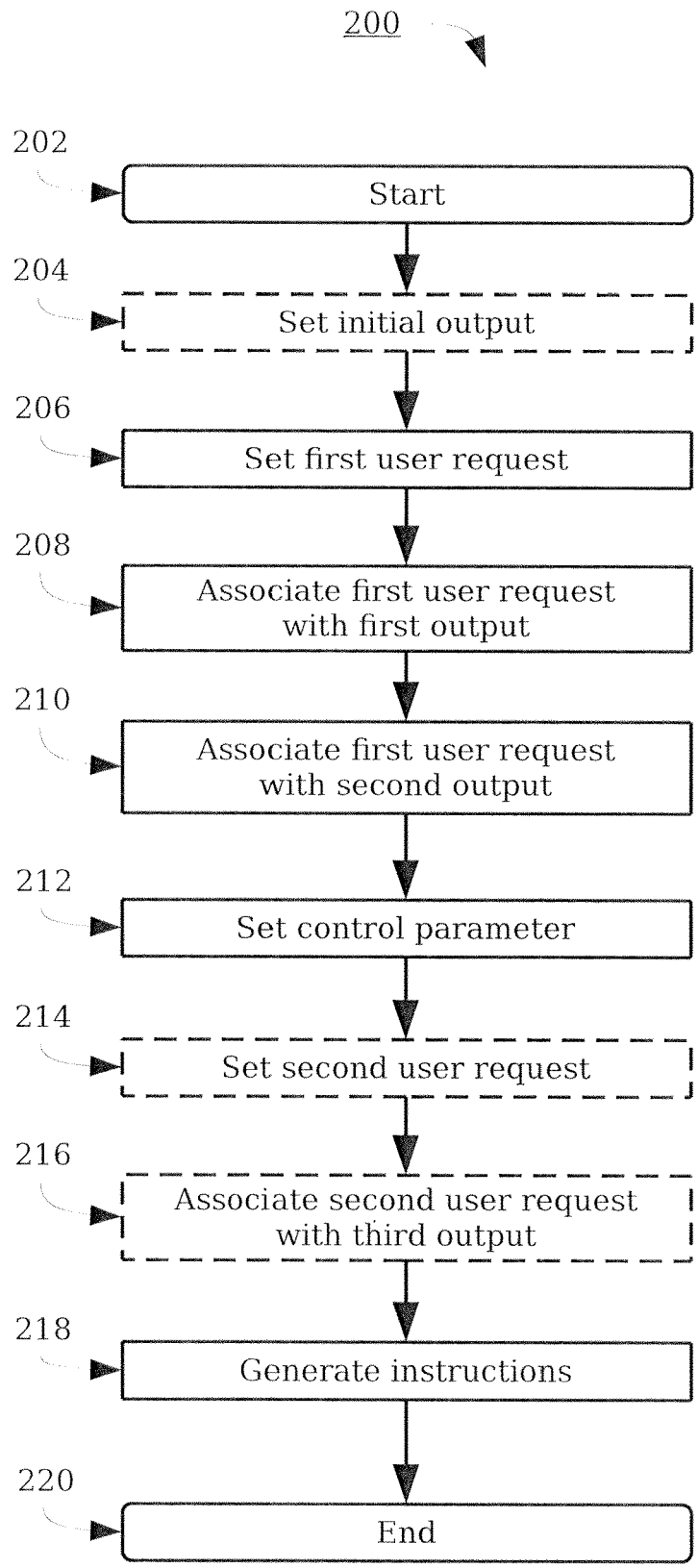
FIG. 2 represents a flow chart of a method for configuring a virtual assistant according to an embodiment.

FIG. 2 shows a flow chart of a method 200 for configuring a virtual assistant according to an embodiment. The method 200 may be executed by an instance 104 of a configuration software. After startup 202, the software sets an initial output, 204. This output may cause the virtual assistant to ask a user a question. In this case, the software may display the question in an answer node via the second user interface as detailed with respect to FIG. 3. However, this is optional. In case no initial output is set, the system may wait for an input by the user, which may be shown in a trigger node as detailed below. A first user request is set, 206, which may be an expected verbal input from a user. This verbal input may be clearly identified, such as an affirmative answer to a question, but it may have a different semantic meaning depending on situational parameters. The first user request is associated with a first output, 208, and a second output, 210, which take into account the different situational parameters. A control parameter is set, 212, depending on which an output is selected in case the first user request is received. Optionally, a second user request may be set, 212, such as a negative answer to a question, which may be associated with a third output, 214. Alternatively, a fourth output may be associated to the second user request, and a second control parameter may be set depending on which the third or fourth output is selected. At 218, instructions are generated that configure the virtual assistant to respond to the first user request by selecting either the first output or the second output depending on the determination of the control parameter by the virtual assistant, and to respond to the second user request by selecting the third output. Alternatively, a larger number of user requests, outputs, and control parameters may be defined.

Figure 3:
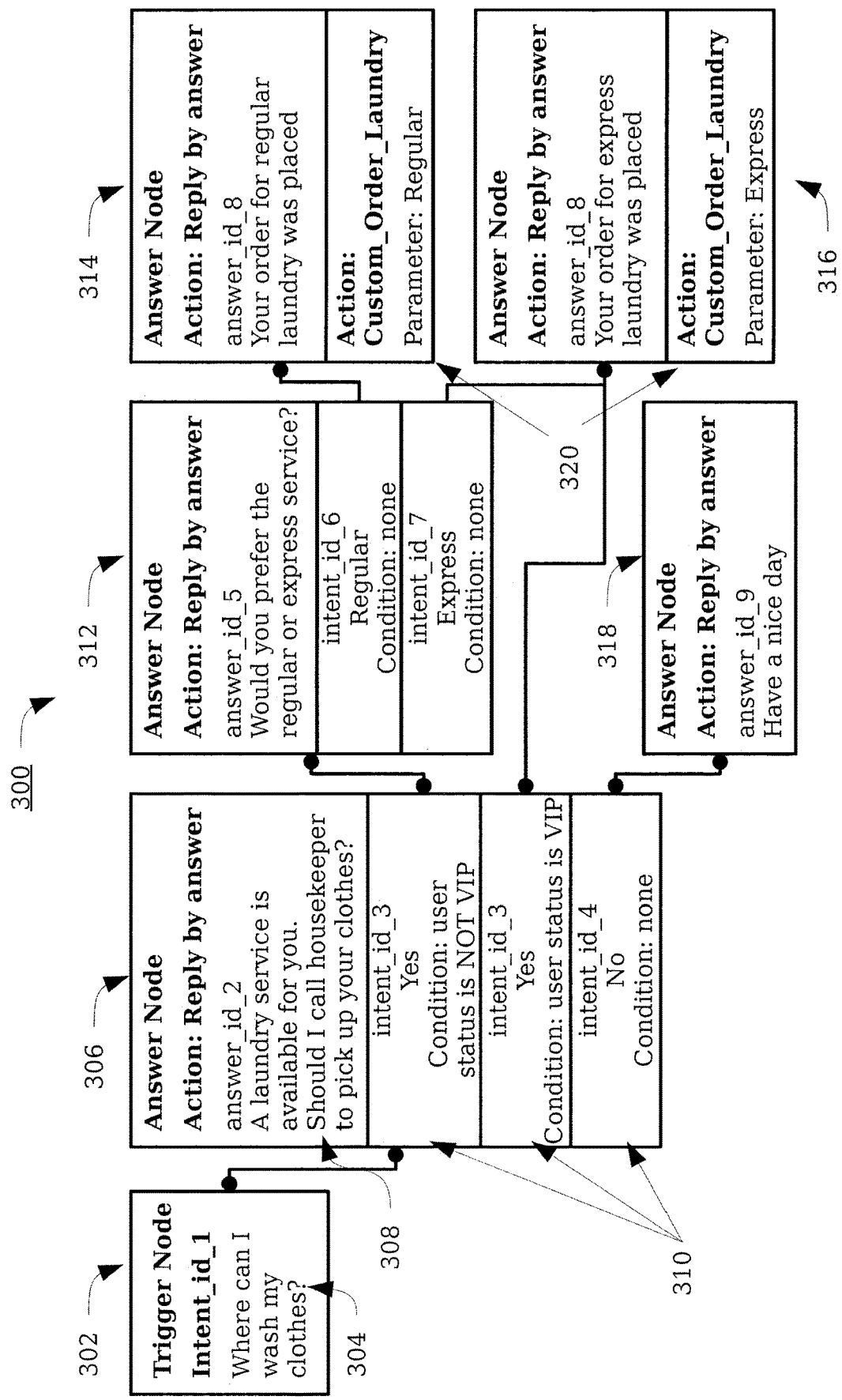
FIG. 3 represents a graphical output of a dialog according to an embodiment.

FIG. 3 shows an example dialog 300 as shown by the computing device according to an embodiment. The dialog comprises a plurality of nodes as described below. In this exemplary embodiment, a trigger node 302 comprises a user request. In this illustrative example, a request for a laundry service is given to a virtual assistant, which may be a common situation in a hotel room. The dialog starts once the question indicated in the user request is received by the device. The answer node 306 indicates an initial reply 308, which comprises information given to the user. The initial reply 308 also comprises a related question that is subsequently asked, for example that a laundry service is available, and the question if the user wants to use it. That is, in the present example, the question is a binary (yes/no) question. The trigger node 302 and the answer node 306 are connected to indicate that the instructions in the answer node 306 are executed in response to the trigger node 302. The answer node 306 further comprises two possible first user requests and one condition relating to a control parameter, shown as three items 310. Two of the three items are associated with an answer in the affirmative. Which of these two user requests is identified depends on the control parameter, marked as a "condition". In this example, the user may be marked as a VIP status user, who will always order express service. The control parameter may be stored in and loaded from a memory connected to the virtual assistant. The control parameter may be generated by a sensor. In this example, the sensor may be a clock, so that the control parameter is set at certain times when only express service is available. Alternatively, the variable may be the output of a speaker recognition device that identifies a client as VIP status user. Alternatively, a control parameter may comprise semantic information of the recognized speech, such as the use of a particular wording. In other exemplary embodiments, any sensor communicatively coupled to the virtual assistant may be used to generate a control parameter. Further referring to the present example, in case the control parameter is set to a first value, an express order will be placed and confirmed as indicated in answer node 316. If this is not the case, a further exchange of a device reply and a user request will follow, as indicated by a further answer node 312, and then, an order will be placed and confirmed (answer nodes 314 and 316). Answer nodes 314 and 316 also comprise actions 320 that do not comprise a device reply, i.e. that do not comprise output given to the user. In the present example, they relate to an output signal given to an order system of a laundry. In alternative embodiments, they may relate to configuring devices, such as setting the volume of a speaker, beginning execution of another program, or switching from one dialog to another.

Figure 4:
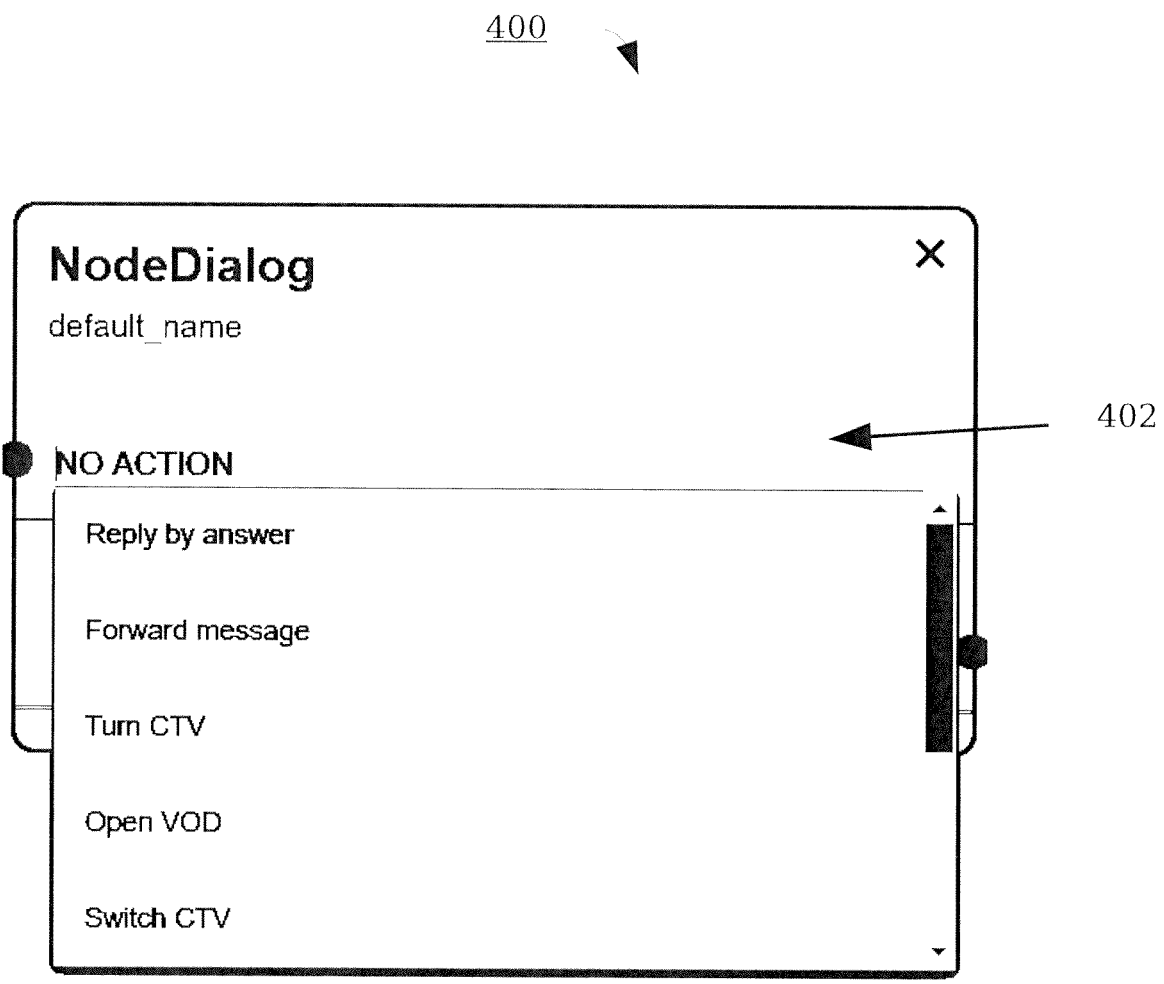
FIG. 4 represents a graphical output of a graphical element according to an embodiment.

FIG. 4 shows a graphical element 400 according to an embodiment. An action 402 may be integrated into the graphical element. The user interface provides options to the developer by a drop-down list or by making search suggestions, e.g. with an autocomplete function, and the developer may give input as to which option is chosen. The actions may furthermore refer to controlling a device. A plurality of actions and a plurality of user requests may be added.

REFERENCE SIGNS

100 System
102 Configuration server
104 Configuration software instance
106 Configuration client
108 Network
110 Virtual assistant server
112 Virtual assistant software
114 Device(s)
116 Input/output hardware
118 Sensor(s)
200 Method for configuring a virtual assistant
202-222 Steps of method 200
300 Dialog
302 Trigger node
304 Initial user request
306 Answer node
308 First device reply
310 User request and condition items
312-318 Further answer nodes
320 Actions

The invention claimed is:

1. A computer-implemented method for configuring a virtual assistant, the method comprising:
setting a first user request to be input via a user interface of the virtual assistant;
setting, before receiving the first user request from a user, an initial output to be selected by the virtual assistant for output in response to the first user request, the initial output prompting for an additional user input;
associating a second user request with a first output of the virtual assistant;
associating the second user request with a second output of the virtual assistant;
setting a control parameter to be determined by the virtual assistant, wherein the control parameter is associated with an identity of the user; and
generating instructions for the virtual assistant which are useable by the virtual assistant to configure the virtual assistant to:
respond to the first user request received from the user by selecting the initial output,
receive a user input corresponding to the second user request,
detect the identity of the user based on one or more properties of the first user request,
determine a value of the control parameter based on the identity of the user,
respond to the second user request by selecting either the first output or the second output as a selected output, depending on the value of the control parameter, and
provide the selected output.

2. The method of claim 1, wherein the user interface of the virtual assistant is one of:
a text user interface;
a graphical user interface;
an image based user interface; or
a speech-based user interface.

3. The method of claim 1, wherein:
the virtual assistant comprises a virtual assistant device; and
information for the control parameter is acquired by an audio sensor communicatively coupled to the virtual assistant device, wherein the information comprises a voice sample of the user.

4. The method of claim 1, wherein an output of the virtual assistant causes one or more of:
a text output by a display;
a speech output by a speaker;
loading or storing a variable in a memory;
output of instructions to configure a device; or
execution of program code.

5. The method of claim 1, wherein the method is executed by a computing device comprising a second user interface.

6. The method of claim 5, wherein the second user interface is a graphical or text user interface.

7. The method of claim 5, wherein setting one or more of the first user request or the initial output, or associating the second user request with the first or second outputs comprises:
providing, by the second user interface, one or more options for at least one of the first user request, the second user request, the initial output, the first output or the second output;
receiving, by the second user interface, an indication of at least one of the first user request, the second user request, the initial output, the first output or the second output; and displaying a graphical element, comprised in the second user interface and indicative of at least one of the first user request, the second user request, the initial output, the first output or the second output.

8. A computing device for configuring a virtual assistant, the computing device configured to execute the steps of:
  setting a first user request to be input via a user interface of the virtual assistant;
  setting, before receiving the first user request from a user, an initial output to be selected by the virtual assistant for output in response to the first user request, the initial output prompting for an additional user input;
  associating a second user request with a first output of the virtual assistant;
  associating the second user request with a second output of the virtual assistant;
  setting a control parameter to be determined by the virtual assistant, wherein the control parameter is associated with an identity of the user; and
  generating instructions for the virtual assistant which are useable by the virtual assistant to configure the virtual assistant to:
    respond to the first user request received from the user by selecting the initial output,
    receive a user input that is responsive to the initial output and corresponds to the second user request,
    detect the identity of the user based on one or more properties of the first user request,
    determine a value of the control parameter based on the identity of the user,
    respond to the second user request by selecting either the first output or the second output as a selected output, depending on the value of the control parameter, and
    provide the selected output.

9. The computing device of claim 8, wherein the user interface of the virtual assistant is one of:
  a text user interface;
  a graphical user interface;
  an image based user interface; or
  a speech-based user interface.

10. The computing device of claim 8, wherein:
  the virtual assistant comprises a virtual assistant device; and
  the control parameter is acquired by a sensor communicatively coupled to the virtual assistant device.

11. The computing device of claim 8, wherein:
  an output of the virtual assistant causes one or more of:
    a text output by a display;
    a speech output by a speaker;
    loading or storing a variable in a memory;
    output of instructions to configure a device; or
    execution of program code.

12. The computing device of claim 8, further comprising a second user interface.

13. The computing device of claim 12, wherein the second user interface is a graphical or text user interface.

14. The computing device of claim 12, wherein setting one or more of the first user request or the initial output, or associating the second user request with the first or second outputs comprises:
  providing, by the second user interface, one or more options for at least one of the first user request, the second user request, the initial output, the first output or the second output;
  receiving, by the second user interface, an indication of at least one of the first user request, the second user request, the initial output, the first output or the second output; and
  displaying a graphical element, comprised in the second user interface and indicative of at least one of the first user request, the second user request, the initial output, the first output or the second output.

15. A system comprising:
  a virtual assistant device; and
  a computing device configured to execute the steps of:
    setting a first user request to be input via a user interface of the virtual assistant device;
    setting, before receiving the first user request from a user, an initial output to be selected by the virtual assistant device for output in response to the first user request, the initial output prompting for an additional user input;
    associating a second user request with a first output of the virtual assistant device;
    associating the second user request with a second output of the virtual assistant device;
    setting a control parameter to be determined by the virtual assistant device, wherein the control parameter is associated with an identity of the user; and
    generating instructions for the virtual assistant device which are usable by the virtual assistant device to configure the virtual assistant device to:
      respond to the first user request received from the user by selecting the initial output,
      receive a user input corresponding to the second user request,
      detect the identity of the user based on one or more properties of the first user request,
      determine a value of the control parameter based on the identity of the user,
      respond to the second user request by selecting either the first output or the second output as a selected output, depending on determination of the control parameter by the virtual assistant device, and
      provide the selected output.

* * * * *